United States Patent [19]

Fitzpatrick et al.

[11] Patent Number: 4,526,946
[45] Date of Patent: Jul. 2, 1985

[54] POLYVINYL CHLORIDE SUSPENSION POLYMERIZATION PROCESS AND PRODUCT HAVING IMPROVED PLASTICIZER ABSORPTION

[75] Inventors: Stephen T. Fitzpatrick, Gilbertsville; Richard M. Krawiec, Audubon, both of Pa.

[73] Assignee: Occidental Chemical Corporation, Niagara Falls, N.Y.

[21] Appl. No.: 507,321

[22] Filed: Jun. 23, 1983

[51] Int. Cl.³ .............................. C08F 2/08; C08F 2/20
[52] U.S. Cl. .................................... 526/202; 526/200; 526/344
[58] Field of Search ............... 526/199, 200, 201, 202, 526/203

[56] References Cited

U.S. PATENT DOCUMENTS

| | | | |
|---|---|---|---|
| 3,004,013 | 10/1961 | Kircher, Jr. | 526/202 |
| 3,042,665 | 7/1962 | Jankowiak | 526/221 |
| 3,125,557 | 3/1964 | Harris | 526/201 |
| 3,375,238 | 3/1968 | Bauer | 526/200 |
| 3,451,985 | 6/1969 | Mahlo | 526/216 |
| 3,627,744 | 12/1971 | Hopkins | 526/87 |
| 3,706,722 | 12/1972 | Nelson | 526/216 |
| 3,725,375 | 4/1973 | Sturt | 526/201 |
| 4,058,495 | 11/1977 | Serratore | 526/200 |
| 4,229,547 | 10/1980 | Cohen | 526/203 |
| 4,345,056 | 8/1982 | Thyret | 526/200 |

FOREIGN PATENT DOCUMENTS 773737  5/1957  United Kingdom ............... 526/200

*Primary Examiner*—Christopher A. Henderson
*Attorney, Agent, or Firm*—James F. Tao; James F. Mudd

[57] ABSTRACT

A polyvinyl chloride having high bulk density and enhanced plasticizer absorption is produced by suspension polymerization of vinyl chloride monomer and comonomers wherein the initial suspension of ingredients is formed such that the oil phase droplets formed in the suspension are compositionally equivalent with respect to initiator, and the level of suspending agent and agitation are chosen to substantially preclude agglomeration of resin particles throughout the reaction, thereby producing resin wherein the resin grain size distribution results directly from the oil phase droplet distribution created at the start of the reaction. Seed particles of resin are introduced to the reaction mixture prior to establishing the final particle distribution. The seed particles can be formed by polymerizing a monomer such as vinyl chloride and mixtures of vinyl chloride and copolymerizable monomers in the presence of a polymeric dispersing agent, and optionally a low boiling solvent which is a non-solvent for the resin being produced. The result of the process of the invention is a polyvinyl chloride polymer or copolymer that has high bulk density and enhanced plasticizer absorption. A further benefit of the process is that resin deposition on the interior surfaces of the reactor is essentially eliminated.

11 Claims, No Drawings

POLYVINYL CHLORIDE SUSPENSION POLYMERIZATION PROCESS AND PRODUCT HAVING IMPROVED PLASTICIZER ABSORPTION

BACKGROUND OF THE INVENTION

The invention is directed to a process for the suspension polymerization of vinyl chloride monomer to produce vinyl chloride resin. In the suspension polymerization of vinyl chloride monomer, it is customary to mix a large volume of water together with suitable suspending agents, an initiator and the vinyl chloride monomer in a reactor under suitable agitation. The mixing of the foregoing reaction ingredients results in the formation of droplets of vinyl chloride monomer in the aqueous medium. When no special care is taken as to the order of addition of the various components, the droplets have various concentrations of initiator depending on the random nature in which the initiator distributed itself when the body of vinyl chloride monomer was dispersed in the aqueous medium by the agitator. Under these circumstances, as the polymerization proceeds, various size particles are formed as a result of the agglomeration of the initially formed particles, varying from lumps down to tiny particles usually referred to as "fines". The resulting polymer product upon recovery from the process is a heterogeneous mixture of particles of various sizes and shapes. The particles have a wide particle size distribution and have a relatively low bulk density. The conventional process also results in the formation of polyvinyl chloride resinous deposits or scale on the walls of the reactor to such an extent that it is ordinarily necessary to open the reactor after every one or more production runs so that the reactor scale can be removed from the walls.

U.S. pending application Ser. No. 204,739, filed Nov. 7, 1980, now abandoned is directed to a novel suspension polymerization process for producing polyvinyl chloride resin. The process is carried out under conditions such that the initial suspension of monomer droplets is formed so that the monomer droplets have equivalent amounts of initiator accessible to the monomer droplets. The level of suspending agent and agitation are chosen to preclude agglomeration of the initially formed droplets to produce a resin whose grain size distribution results directly from the monomer droplet distribution created at the start of the reaction. In this process, polymerization does not begin until after the oil phase droplet distribution is established. The process results in formation of nearly uniform spherical particles that have a narrow grain size distribution. The particles are substantially free of sub-grains because agglomeration has not occurred during the process. Resin deposition on the interior surfaces of the reaction vessel is essentially eliminated. The resulting resin particles have a desirable high bulk density which facilitates their use in extrusion processes. The spherical nature of the particles improves their flowability.

The process of copending application Ser. No. 204,739, involves the following steps:

(1) separately mixing (a) a polymerization initiator and other oil soluble additives with a vinyl chloride monomer, and (b) suspending agent and other water soluble additives with the aqueous phase, (2) irrtroducing the two phases into a polymerization zone, (3) initiating agitation to disperse the oil phase as droplets of vinyl monomer having a uniform concentration of initiator, (4) heating the reactor to an elevated temperature while maintaining agitation until the reaction proceeds to a high conversion of monomer, (5) stripping residual vinyl monomer, and (6) drying the polyvinyl chloride produced.

While the just described process has many advantages as set forth above, the process produces particles with a pericellular membrane or skin on the surface of the particle which reduces plasticizer absorption. The particles of the process are excellent for applications such as extrusion of the resin to produce shaped articles, but the product is not well suited for applications requiring inclusion of a plasticizer. Accordingly, it is an object of this invention to modify the process of the copending application Ser. No. 204,739, so that it will produce a product having improved plasticizer absorption.

SUMMARY OF THE INVENTION

Polyvinyl chloride particles that have all the advantages of the above-described process disclosed in copending application Ser. No. 204,739, and additionally have enhanced plasticizer absorption are produced by introducing a preformed resin seed material into the polymerization process together with the other reactants. The presence of these seed particles in the oil phase or monomer droplets result in the formation of a resin particle that has enhanced plasticizer absorption.

The seed material can be produced by polymerizing a monomer such as vinyl chloride or a mixture of vinyl chloride and a copolymerizable monomer in a volatile organic medium, that is a solvent for the monomer, but a non-solvent for the polymerization products. The organic medium contains a polymeric dispersing agent that has affinities for both the organic medium and for the polymerization products. The result is a fine dispersion of the polymerization products in the organic medium. This component will be referred to herein as the non-aqueous emulsion or NAE.

The polymeric dispersing agent used in producing the NAE can be any polymeric substance with functional groups that have an affinity for the polymerization medium and also groups that have an affinity for the polymer or co-polymer produced. The polymeric dispersing agents can be prepared by reacting a suitable monomer in a solvent for monomer and polymer along with an oil soluble initiator and a chain transfer agent.

DETAILED EMBODIMENTS OF THE INVENTION

The suspension polymerization process of this invention utilizes a component that shall be referred to herein as the non-aqueous emulsion (NAE). Preparation of the NAE involves use of a polymeric dispersing agent (PDA). Examples of the PDA and NAE are disclosed in U.S. Pat. No. 3,795,649, the disclosure of which is incorporated herein by reference. However the preparation of the PDA and NAE will be additionally described as follows.

Preparation of Polymeric Dispersing Agent (PDA)

The polymeric dispersing agent (PDA) can be any polymeric substance which (a) is soluble in the polymerization medium, that is, contains groups which have affinity for the medium and which also (b) carry groups having affinity for the polymer of the non-aqueous emulsion, which is usually polyvinyl chloride. Examples of polymeric dispersing agents suitable for use in preparing the non-aqueous emulsion are exemplified in polymers of fatty alcohol esters of acrylic and methacrylic acid such as 2-ethylhexyl acrylate, n-decyl acrylate, n-dodecyl acrylate (lauryl acrylate), n-octadecyl acrylate (stearyl acrylate), the corresponding methacrylate esters and various copolymers of the above monomers. Other suitable polymers include graft copolymers of vinyl chloride on polyolefins such as polymers of ethylene, propylene and a diene, such as 1,4-hexadiene. Monomers for preparing the PDA may include vinyl chloride, so long as it is copolymerized with other ethylenically unsaturated monomers to meet the criteria (a) and (b) above.

The PDA should be moderately low in molecular weight, on the order of 1,000 to 50,000. This molecular weight adjustment is achieved by incorporating chain transfer agents in the polymerization of the PDA. Suitable chain transfer agents include alkyl mercaptans containing 4 to 18 carbon atoms such as n-dodecyl mercaptan, n-butyl mercaptan, n-octyl mercaptan, n-decyl mercaptan, n-dodecyl mercaptan (lauryl mercaptan), n-octadecyl mercaptan (stearyl mercaptan) and the like.

The preparation of the PDA is carried out in the presence of a liquid medium which is a solvent for the PDA, compatible with vinyl chloride, immiscible with polyvinyl chloride, and which does not inhibit the polymerization. The preferred compounds for this purpose are the low boiling hydrocarbon solvents such as butane, pentane, hexane, heptane, petroleum ether, benzene, toluene, and the like, and also mixtures of any two or more of these in any proportion.

The polymerization is conducted in the presence of a free-radical catalyst or initiator which is usually one which is soluble in the organic medium such as lauroyl peroxide, benzoyl peroxide, diiopropyl peroxdicarbonate, tertiary butyl peroxypivalate, acetyl cyclohexane sulfonyl peroxide, α,α'-azobis (isobutyronitrile), α,α'-azobis (α,α-dimethyl valeronitrile) and the like.

The preparation of the PDA is generally carried out by dissolving the monomer in the liquid medium, adding the initiator and chain transfer agent and conducting the reaction at 40° to 160° C., preferably 50° to 100° C. under mild agitation for a period of 4 to 48 hours. The proportion of initiator is about 0.01 to 0.5 parts by weight per hundred parts of monomer. The proportion of transfer agent used is specific to the material employed but sufficient to give the desired molecular weight. The reaction mixture can be employed to produce the non-aqueous emulsion directly, or the PDA can be removed from the medium if desired.

Preparation of the Non-Aqueous Emulsion (NAE)

The NAE is preferably prepared from vinyl chloride alone. However, ethylenically unsaturated compounds copolymerized therewith can be employed generally in amounts up to about 35 weight percent, based on the total weight of the copolymer. Suitable comonomers include vinyl acetate, vinyl propionate, vinyl stearate, vinylidene chloride, styrene, vinyl pyridine, acrylic and methacrylic esters such as methyl acrylate, ethyl acrylate, octyl acrylate, methyl methacrylate, ethyl methacrylate, butyl methacrylate, dodecyl methacrylate and the like, acrylonitrile, alkyl maleates, alkyl itaconates, vinyl ethers and ketones such as methyl vinyl ether, methyl vinyl ketone, methyl isopropeyl ketone and the like.

The same reaction medium and initiators that are disclosed for preparation of the PDA can also suitably be employed for the preparation of the NAE.

The preparation of the NAE is carried out by dissolving the PDA and initiator in the reaction medium. If the PDA is used directly as prepared, that is, containing the solvent and initiator resulting from the preparation of the PDA, then the vinyl chloride and optional comonomers are dissolved in the PDA reaction product. In any event the PDA is employed in a proportion of about 1 to 12 weight percent based on the weight of the reaction medium. The initiator is employed in a proportion of about 0.01 to 1 weight percent based on the weight of the vinyl chloride monomer carried out in one stage but may be carried out in more than one stage. In the latter case, only a portion of the vinyl chloride is charged at the outset of the polymerization. The remainder of the vinyl chloride plus additional reaction medium and initiator are added as required, and the polymerization carried to completion. The initially introduced vinyl chloride may amount to about 5 to 25 percent by weight of the finally polymerized vinyl chloride product. The product of the reaction is an emulsion of the polymerized monomers and shall be referred to as the non-aqueous emulsion or NAE.

The Suspension Polymerization (1) The Reaction Components

Vinyl chloride is the preferred monomer for the suspension polymerization. Vinyl chloride monomer that is greater than 95% pure is preferably utilized as the monomer in the oil-soluble solution. In many commercial processes, recycled vinyl chloride monomer is utilized, and the process of the invention accommodates this practice. Reaction kinetics must be optimized to account for the reactive impurities in recycle streams. Generally, if a recycle stream contains less than about 5 percent impurities it can be utilized as monomer without further treatment, depending upon the identity of the impurities.

Various comonomers can be used with the vinyl chloride monomer generally in a proportion of up to about 50 weight percent of the total monomer component. Suitable comonomers include unsaturated esters including vinyl esters such as vinyl acetate, vinyl propionate, vinyl butyrate and vinyl benzoate; alkyl methacrylates, such as methyl methacrylate; alkyl acrylates, such as 2-ethylhexyl acrylate. Many other suitable comonomers are disclosed in U.S. Pat. No. 4,007,235, the disclosure of which is incorporated herein by reference.

The initiators used in the process are free radical initiators and can be any of the commonly utilized peroxy compounds. Suitable peroxy compounds include diacylperoxides like lauroylperoxide, decanoylperoxide, benzoylperoxide and others (although not necessarily symmetric); peroxyesters like cumylperneodecanoate, t-butylperneodecanoate, cumylperipivalate and others; peroxydicarbonates like isopropylperoxydicarbonate, sec-butylperoxydicarbonate, 2-ethylhexylperoxydicarbonate, dicetylperoxydicarbonate and others (although not necessarily symmetric); azo compounds like azoisobutyronitrile and other (although not necessarily symmetric) or any essentially oil-soluble free radical initiator commonly utilized for vinyl polymerization. Initiator(s) and level(s) are selected to provide a uniform rate of reaction over the desired reaction time.

Additives can be used on a selective basis in the aqueous or oil phases. Additives include secondary suspending agents such as glycerol monolaurate, sorbitan monolaurate, sorbitan monostearate, functionalized cellulosics like hydroxypropylcellulose, low hydrolysis (20-40%) poly (vinyl acetate) and others; antioxidants like butylatedhydroxytoluene, substituted pyhenols, triodipropionate esters, phosphites and others; chain-transfer agents, capable of modifying polymer molecular weight, such as trichloroethylene, 1,2-dichloroethylene, t-dodecylmercaptan, mercaptoethanol and others.

Primary suspending agents that can be incorporated into the solution containing water solubles include any of the commonly utilized suspending agents such as modified cellulose polymers like hydroxypropylmethylcellulose of various molecular weights, high hydrolysis (60-95%) poly(vinyl acetate), and water-soluble natural product polymers such as guar gum or gelatin.

Optional chelating agents that can be incorporated into the solution containing water-solubles are any of the common materials that give rise to ligands capable of binding multivalent metal ions. Examples are alkali metal or ammonium salts of ethylenediaminetetraacetic acid (EDTA) or nitrilotriacetic acid (NTA). Chelating agents are not absolutely necessary, but have been found to help maintain reactor cleanliness. Buffering systems can also be used to control pH in the aqueous phase.

Table 1 summarizes the proportions in which the reaction components are employed in the processes of the invention.

TABLE 1

| REACTION COMPONENTS | BROAD RANGE | PREFERRED RANGE |
| --- | --- | --- |
| Water phm | 80-300 | 120-170 |
| Initiator phm | 0.002-0.2 | 0.002-0.2 |
| Primary Suspending Agent phm | 0.03-3 | 0.05-0.2 |
| Secondary Suspending Agent phm | 0-0.5 | 0-0.2 |
| Chelating Agent phm | 0-0.5 | 0-0.25 |
| Non-Aqueous Emulsion phm | 0.01-20 | 0.5-5 |

(2) Reaction Variables

In the process of our invention, a technique known as "reverse charge" is utilized to polymerize the vinyl chloride monomer and any comonomers. Reverse charge is herein defined as that system providing homogeneous mixing of oil-soluble and water-soluble ingredients in separate phases or vessels before creation of a suspension. It is important to note a variation of this procedure which has also proved effective: premixing oil and water-soluble materials in separate charge stages, delivering appropriate amounts of each material in a single pipe, then creating a suspension by means of a pipeline mixer before final deposition into a reaction vessel. Our preferred embodiment is chosen because little or no modification of commercial equipment and processes is required for its utilization. In this invention the non-aqueous emulsion is mixed with the oil soluble components.

Sequence of addition of ingredients is important, but any selected sequence capable of providing compositionally uniform droplets is acceptable. Moreover, not all additions of ingredients need be made at the beginning of the reaction: for example, additional monomer can be added continuously or incrementally to the system so long as suspension stability is maintained and no significant new droplet family is generated.

Bulk addition of oil-soluble initiator to an agitated mix of monomer in the aqueous phase, a normal charge, produced poor resin in that not every monomer-containing droplet contains initiator early in the reaction. Droplets containing high concentrations of initiator can proceed to polymer at high conversion early in the reaction. This can cause abnormally large or discolored resin grains, an unacceptable result.

It has long been known that agitation is, in a large measure, responsible for establishment of the suspension droplet size distribution; suspending agent identity and level are other important variables. Ordinarily, however, agitation is kept at a high level and suspending agent at a low level resulting in poor coverage of the initial droplet distribution. As the reaction progresses, resin grains become unstable and tend to agglomerate.

In the preferred embodiment, agitation and suspending agent levels are modified to avoid just such agglomeration. In order to do this, certain optimizations must be carried out in a given reactor, as agitation depends not only on stirring rate and agitator design but also reactor geometry and baffling. In our laboratory reactors, (glass or stainless steel, 1½ liter capacity, inverted-T stirrer) stable batches can be obtained by charging 0.1 parts per hundred parts of monomer (phm) of a cellulosic suspending agent and by establishing suspension droplets with a 375 rpm stirring rate. Additionally, suspensions appear to be essentially unresponsive to increased stirring rate when carried beyond 20-30% conversion, and to decreased stirring rate significantly earlier.

In general, it is advisable to have a narrow grain size distribution as determined by screen analysis. Our preferred embodiment as mentioned above yields a product whose grain size distribution can be more effectively controlled; normal reactions will ordinarily yield broader distributions.

Normally a mixture is heated to a preselected temperature after agitation is begun. The reaction temperature, which controls the rate of thermolysis of the free-radical initiator and, therefore, the reaction rate, as well as the molecular weight of the resin itself, is maintained by removal of heat of reaction by any of the conventionally used procedures. These procedures include the use of condensers, cooled jacket or baffles and the like.

"Pressure drop" describes the point in a reaction when monomer concentration is no longer great enough to saturate polymer at a given temperature. Pressure drop usually occurs at greater than 70% conversion. To attain maximum bulk density, as in our preferred embodiment, the reaction is allowed to continue to slightly higher (75 to 80 percent) conversion because it is well known that reaction conversion has a large effect upon resin porosity and bulk density. Monomer removal by conventional strippng is ordinarily made more difficult, however, by high conversion.

After stripping, resin is dewatered and dried using any conventional process, for example, by centrifugation and drum drying. Wetcake water content is inversely proportional to resin bulk density. Dried resin can then be packaged or stored in bulk.

Table 2 summarizes the reaction conditions employed in the process of the invention.

TABLE 2

| REACTIONS CONDITIONS | BROAD RANGE | PREFERRED RANGE |
| --- | --- | --- |
| Reaction Temperature °C. | 30–80 | 40–65 |
| Agitation* RPM | 30–400 | 40–100 |
| Solids content in reactor % | 25–55 | 35–50 |
| Time Hour | 2–12 | 4–8 |

*agitation speed is dependent on reactor size and geometry.

(3) Properties and Advantages

The products of the processes of the invention are characterized by high bulk density particles having good dryness. The particles are spherical in shape which improves their flowability. The particles of the processes have narrow particle size distribution which results from the substantial lack of agglomeration of particles that occurs during the processes. By contrast, commercially available resins are characterized by grains which in turn consist of sub-grains that have agglomerated during the polymerization. This agglomeration results in a wide variety of particle size distribution which is avoided by the processes of the present invention.

The processes of the invention result in little or no buildup of the polymer scale on the walls of the reaction zone. Again, this is in contrast to conventional vinyl chloride suspension processes which are characterized by production of undesirable polymer buildup upon an exposed interior surface of the reaction vessel including the walls, agitator and baffles.

The processes of the invention facilitate stripping of the unreacted vinyl chloride monomer and result in decreased manufacturing costs in the production of the resin product.

The processes of the invention result in a superior polymer product that is characterized by enhanced plasticizer absorption, which coupled with its other valuable properties has a wide range of utility.

The uniquely spherical, regular particle morphology of this resin makes it highly flowable and easy to handle.

A less preferred application for the resins of the invention is in the manufacture of pipe, conduit and siding by extrusion process. Higher extrusion rates, proportional to increased bulk density, are achieveable.

The following examples are intended to illustrate the invention but not to limit its scope. Wherever used in this specification and claims, parts and proportions are by weight and termperatues are in degrees Celsius, unless indicated otherwise.

In the following examples, the extent of plasticizer absorption of the polyvinyl chloride products was measured by the "dryness time" or time for plasticizer to be absorbed into a particulate sample of the polyvinyl chloride using the following test procedure. The bulk density of the polyvinyl chloride products was also determined. The procedure is a modified form of ASTM Test D 2396-79.

In the test procedure, the PVC resin in particle form and a filler mixture are added to the Sigma head (type 3S300C or equivalent) of a Brabender Plasti-Corder (Model PLV-2 or equivalent) and premixed for 5 minutes at a head temperature of 81.0°±0.2° C. The Plasticorder is operated at a speed of 60 RPM. Then, 103 grams of a plasticizer and stabilizer mixture are added to the resin-filler mixture. This results in a pasty mixture and an increased torque. The blend returns to a free-flowing state as the plasticizer is absorbed into the resin particles, as evidenced by decreased torque. The time for the plasticizer-stabilizer-resin mixture to return to a free-flowing state is recorded as the "dryness time". A hot, tamped bulk density is then determined on the blend after it is removed from the Sigma head. In this procedure, there are employed 200 grams of PVC resin, 85 grams of Atomite or Camelwite filler which are mixed prior to addition of the plasticizer-stabilizer mixture and mixed for five minutes. The plasticizer-stabilizer mixture comprises 420 grams of diisodecyl phthalate, 60 grams of Monoplex S-73 (Rohm and Haas Company), 30 grams of Mark 180 (Argus Chemical Company) and 5 grams of Mark PL (Argus Chemical Company). The dryness time of each blend is reported as the number of minutes from the addition of the plasticizer-stabilizer mixture to the dry point. The dry point is determined by the intersection of the straight lines drawn through the final level portion of the torque curve and through the descending portion of the curve immediately preceeding on the plasticorder recording chart. A sample of the resin blend is removed from the apparatus into a 100 cc. graduated cylinder for determination of the bulk density by tamping the powdered mixture by raising the graduate one inch above a board and letting it fall back against the board for eight times. The density is calculated from the volume and weight of the resin sample after tamping.

PVC resins that are useful in "flexible" applications such as films, generally have a dryness time of up to about 18 minutes in accordance with the foregoing test, preferably up to about 10 minutes. Resins with higher dryness times are useful in rigid applications such as molded articles.

Example 1—Preparation of Poly(stearyl methacrylate) (PSTMA)

To a 1 quart glass bottle was charged 2.0 g (1.0 phm) lauroyl peroxide, 0.1 ml (0.05 ppm) n-dodecyl mercaptan, 200 g (100 phm) n-hexane and 200 g (100 phm) stearyl methacrylate. Nitrogen gas was bubbled through the reaction contents for 5 minutes, then the bottle was sealed. The bottle was placed in a bottle polymerizer at 70° C. and allowed to react for 24 hours. The 50 percent solids solution was used in subsequent polymerizations.

Example 2—Preparation of Non-Aqueous Emulsion

To a 1.5 liter glass laboratory reactor was charged 1.3 ml of a 24% solution of sec-butylperoxydicarbonate in toluene (0.089 phm). Then was charged 3.5 g poly(stearyl methacrylate) PSTMA, 50% in hexane (0.5 phm) and 353 ml (67.0 phm) of n-hexane. After purging this mixture with nitrogen gas, 350 g (100 ppm) of vinyl chloride monomer (VCM) was introduced. The reaction contents were stirred at 100 rpm and allowed to react at 45° C. for 1.0 hour at which time 10.5 g (1.5 phm) of the PSTMA solution and 37.0 ml (8.43 phm) n-hexane were introduced to the reator. The reaction was allowed to continue to completion (23 hours) at which time the resulting non-aqueous emulstion was vented and stripped. This emulsion had a particle size of 0.54 μm and a solids content of 51.2 percent.

Example 3—Preparation of Bulk Non-Aqueous Emulsion

To a purged laboratory reactor was added 0.18 g cumylperneodecanoate (Esperox 939M, Witco Chemical Co.) 12.0 g (1.33 phm) PSTMA (50% in n-hexane), 32.8 g (7.3 phm) n-hexane and 450 g (100 phm) VCM. Agitation was started at 100 rpm and the reaction heated at 45° C. for 2.0 hours. The reaction contents were allowed to cool and removed by means of a pressurized bomb. The particle size was 0.52 µm and conversion measured at 25.9 percent.

Example 4—Preparation of Bulk Non-Aqueous Emulsion

To a purged laboratory reactor was added 0.18 g (0.04 phm) cumylperneodecanoate, 2.25 g EPDM rubber (Epsyn 40A), 6.6 g (1.47 phm) of n-hexane, 0.02 g (0.0044 phm) α-methyl styrene and 450 g (100 phm) of VCM. Polymerization was carried out at 45° C. with an agitation speed of 100 rpm. After 1.0 hour 13.4 g (1.55 phm) PSTMA (52.2% in n-hexane) and 30.0 g (6.67 phm) n-hexane were introduced to the reactor. After a total of 3.7 hours, reaction contents were removed by means of a pressurized bomb. The particle size was 0.35 µm and reaction conversion was 24.5 percent.

Example 5—Seeded Suspension—Normal Charge

To a nitrogen purged laboratory reactor was added 140 g (0.4 phm) of a 1% solution of hydroxypropylmethylcellulose (HPMC) (Methocel F-50, Dow Chemical Co.), 560 g (160 phm) water and 0.20 g (0.057 phm) $(NH_4+)_4$EDTA. After addition of water soluble ingredients, 0.12 g (0.034 phm) sec-butyl peroxydicarbonate (SBP), 25.0 g (2.1 phm) of 29.0% NAE (produced by the procedure of Example 2) in hexane (0.57 µm particle size) was added. Then, 350 g (100 phm) of VCM was introduced. The reaction was carried out at 55° C. for 54 hours with an agitation speed of 260 rpm. The resulting resin was stripped, dewatered and dried. This resin had a bulk density of 0.49 g/ml, and dryness time of 5.7 minutes.

Example 6—Seeded Suspension-Premix

To a nitrogen purged laboratory reactor was added 140 g (0.4 phm) of a 1% solution of HPMC (Methocel F-50, Dow Chemial Co.), 560 g (160 phm) water and 0.20 g (0.057 phm) $(Na+)_4$ EDTA. In a separate vessel was mixed 0.6 g (0.171 phm) dicetylpercarbonate, 3.3 G (0.5 phm) of 53.3% NAE (produced by the procedure of Example 2) in hexane (0.62 µm particle size), 11.2 g (3.2 phm) n-hexane and 350 g (100 phm) VCM. This mixture was then introduced to a reactor agitating at 250 rpm. The reactor was heated to 55° C. to conduct the polymerization. After 1.5 hours the agitation was increased to 400 rpm. The reaction was allowed to continue for a total of 3.0 hours at which the reaction was terminated. This resin had a bulk density of 0.50 g/ml, and dryness time of 8.0 minutes.

Example 7—Control

To a purged 50 gallon glass lined reactor with retreating blade agitator and finger type baffle was added 15.0 pounds (0.15 phm) of a 1% solution of Methocel F-50 (Dow Chemical Co.), 0.057 pounds (0.057 phm) $(Na+)_4$ EDTA and 177 pounds (177 phm) water. Then was added 100 pounds (100 phm) VCM. By use of a positive displacement pump, 0.034 pounds (0.034 phm) SBP, and 6.0 pounds (6.0 phm) n-hexane were introduced to the reactor. Polymerization was carried out at 55° C. for 3.4 hours at an agitation rate of 90 rpm. The resulting resin had a bulk density of 0.56 g/ml and a dryness time of 40.3 minutes. This value is unacceptably high for a flexible application. Particle size distribution is listed in Table 1.

Example 8—Seeded Suspension, Pilot Plant Scale

To a purged 50 gallon glass lined reactor was added 15.0 pounds (0.15 phm) of a 1% solution of Methocel F-50 (Dow Chemical Co.), 0.057 pounds (0.057 phm) $(Na+)_4$ EDTA and 185 pounds (185 phm) water. Then was added 100 pounds (100 phm) VCM. By use of a positive displacement pump (0.034 phm) SBP and 6.0 pounds (2.0 phm) of a 33.3% NAE (produced by the procedure of Example 2) in hexane were introduced to the reactor. Polymerization was carried out at 55° C. for 3.8 hours at an agitation rate of 80 rpm. This resin gave a bulk density of 0.46 g/ml, a dryness time of 6.5 minutes. Particle size distribution is listed in Table 1.

TABLE 1

| Screen Mesh No. | Percent Retained On Screen | |
| --- | --- | --- |
| | Example 7 | Example 8 |
| 40 | Trace | 0.8 |
| 60 | 0.9 | 24.4 |
| 80 | 10.0 | 37.2 |
| 100 | 31.8 | 22.2 |
| 140 | 43.0 | 11.4 |
| 200 | 10.2 | 2.4 |
| Thru | 4.1 | 1.8 |

We claim:
1. A process for the suspension polymerization of vinyl halide which comprises the following steps:
   (1) preparing a solution of a non-aqueous resin seed material, a polymerization initiator and other oil-soluble additives in the vinyl halide, wherein said resin seed material is prepared from monomer in a volatile organic medium that is a solvent for the monomer and a non-solvent for the resin;
   (2) preparing a solution of suspending agent and other water-soluble additives in water;
   (3) introducing solutions (1) and (2) into a polymerization reaction zone;
   (4) initiating agitation to a sufficient level to form oil-phase droplets of the size of the desired product particle size, said droplets having a uniform concentration of initiator in the vinyl halide, and continuing the agitation and maintaining elevated reaction temperature until the reaction proceeds to 70 to 95 percent conversion; and
   (5) recovering the resin product;
wherein the levels of suspending agent and agitation are chosen to substantially preclude agglomeration of resin particles during the reaction; thereby producing resin wherein the resin grain size distribution results directly from the oil phase droplet distribution created in step (4).

2. The process of claim 1 wherein the resin seed material is in the form of a non-aqueous emulsion of a vinyl chloride polymer or copolymer with a copolymerizable monomer.

3. The process of claim 2 wherein the proportion of suspending agent is in the range of about 0.03 to 3 parts by weight per hundred parts by weight of monomer.

4. The process of claim 3 wherein the proportion of initiator is in the range of about 0.002 to 0.2 parts by weight per hundred parts by weight of monomer.

5. The process of claim 4 wherein a secondary suspending agent is employed in a proportion of up to about 0.5 part by weight per hundred parts by weight of monomer.

6. The process of claim 5 wherein a chelating agent is employed in a proportion of up to about 0.5 part by weight per hundred parts by weight of monomer.

7. A process for the suspension polymerization of vinyl chloride monomer which comprises the following steps:
   (1) separately preparing (a) a solution of a non-aqueous, low boiling hydrocarbon-containing resin seed material and a polymerization initiator in the vinyl chloride monomer in a proportion of about 0.002 to 0.2 part by weight of initiator and a proportion of about 0.5 to about 5 parts by weight of seed material, per 100 parts by weight of monomer, and (b) a solution of suspending agent in water in a proportion of about 0.08 to 0.2 part by weight of suspending agent per 100 parts by weight of monomer;
   (2) introducing solutions (a) and (b) into a polymerization reaction zone;
   (3) initiating agitation to a sufficient level to form oil-phase droplets of the size of the desired product particle size, said droplets having a uniform concentration of initiator in the monomer, and continuing the agitation and maintaining elevated reaction temperature until the reaction proceeds to 70 to 95% monomer conversion;
   (4) stripping the residual vinyl monomer, and
   (5) drying the resin product;
   wherein the levels of suspending agent and agitation are chosen to substantially preclude agglomeration of resin particles during the reaction; thereby producing resin wherein the resin grain size distribution results directly from the oil phase droplet distribution created in step (4).

8. The process of claim 7 wherein the resin seed material is in the form of a non-aqueous emulsion of a vinyl chloride polymer or copolymer with a copolymerizable monomer.

9. The process of claim 7 wherein a secondary suspending agent is employed in a proportion of up to about 0.5 part by weight per hundred parts by weight of monomer.

10. The process of claim 9 wherein a chelating agent is employed in a proportion of up to about 0.5 part by weight per hundred parts by weight of monomer.

11. The process of claim 1 wherein the vinyl halide also contains up to about 50 weight percent of a comonomer based on the total weight of monomer component.

* * * * *